Sept. 4, 1928.  F. E. KEY  1,683,555
VALVE
Filed July 17, 1926  3 Sheets-Sheet 1
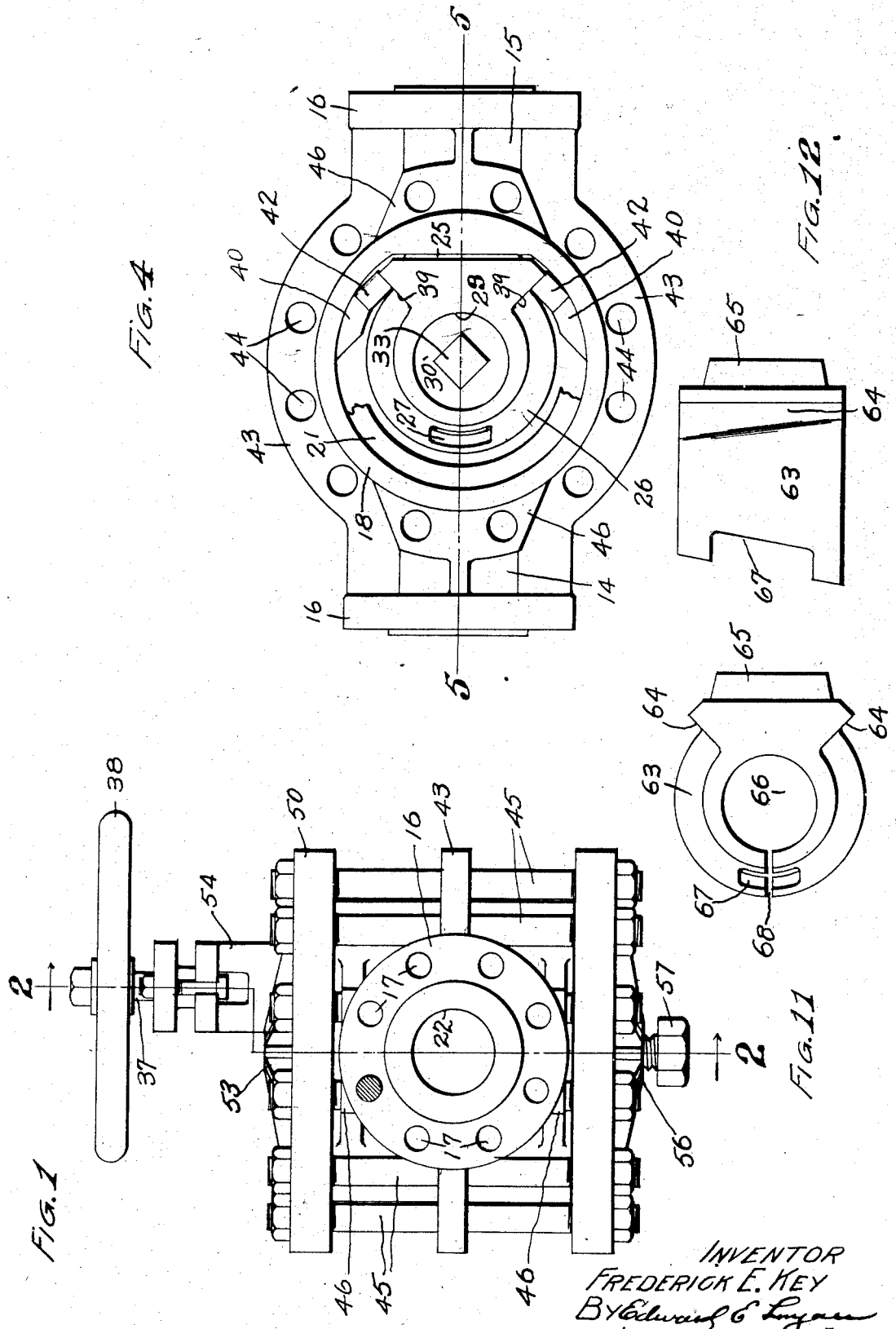

Sept. 4, 1928.　　　　　　　　　　　　　　　　　1,683,555
F. E. KEY
VALVE
Filed July 17, 1926　　　　　3 Sheets-Sheet 2
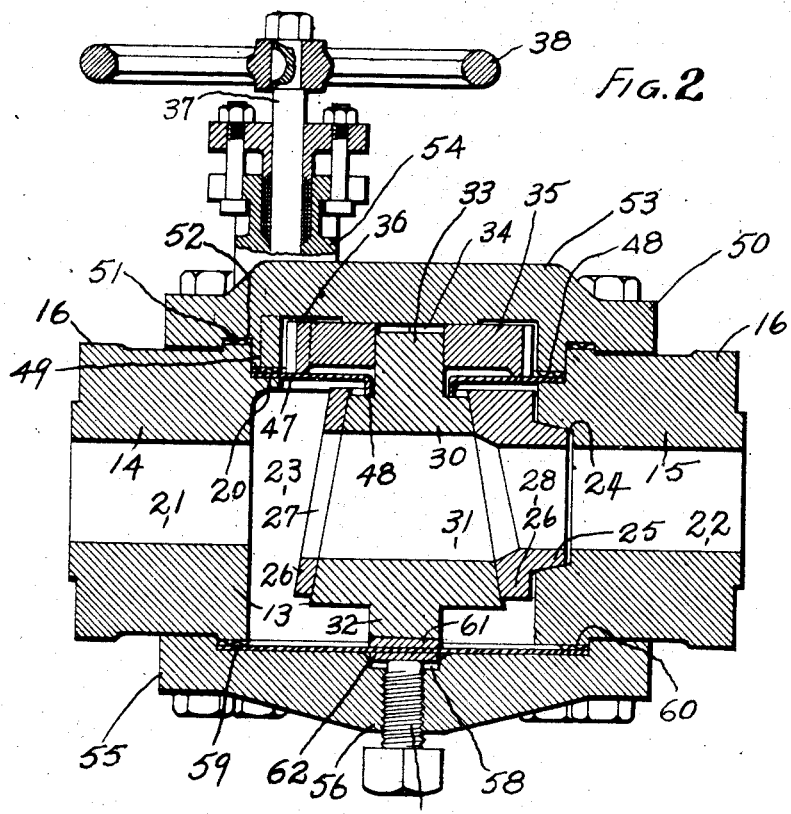
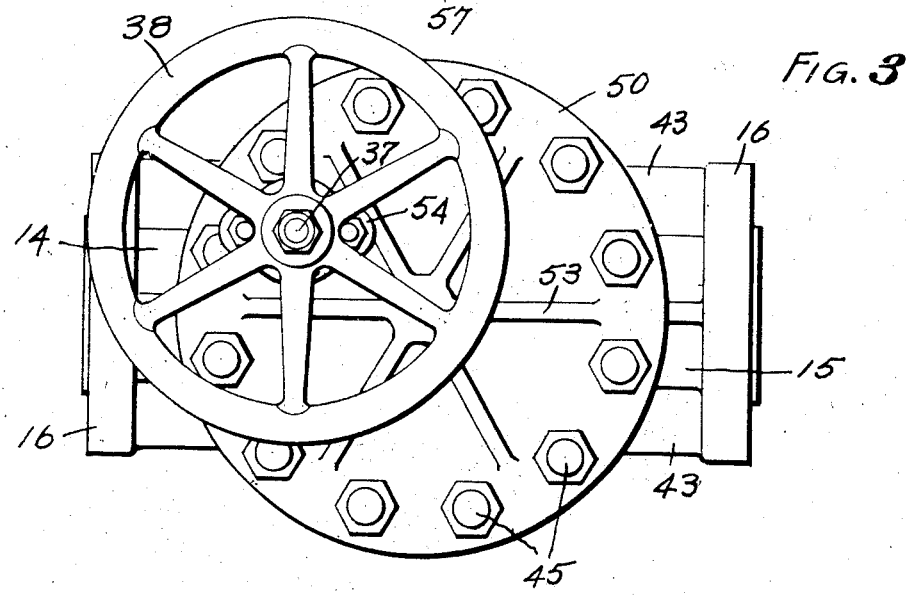
INVENTOR
FREDERICK E. KEY
ATTY.

Sept. 4, 1928.
F. E. KEY
1,683,555
VALVE
Filed July 17, 1926    3 Sheets-Sheet 3
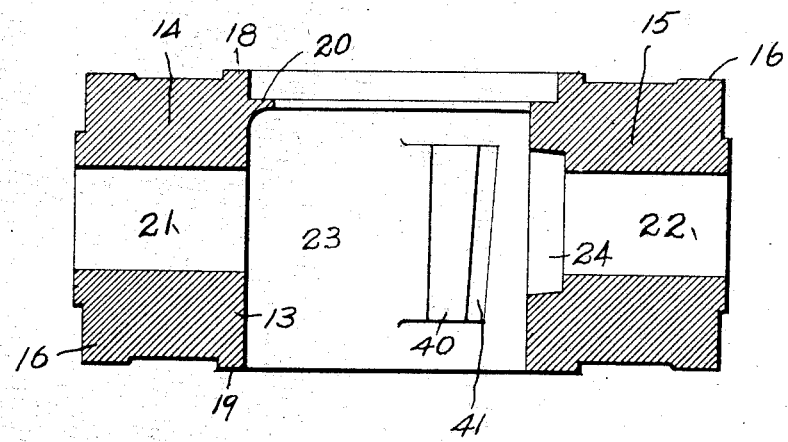
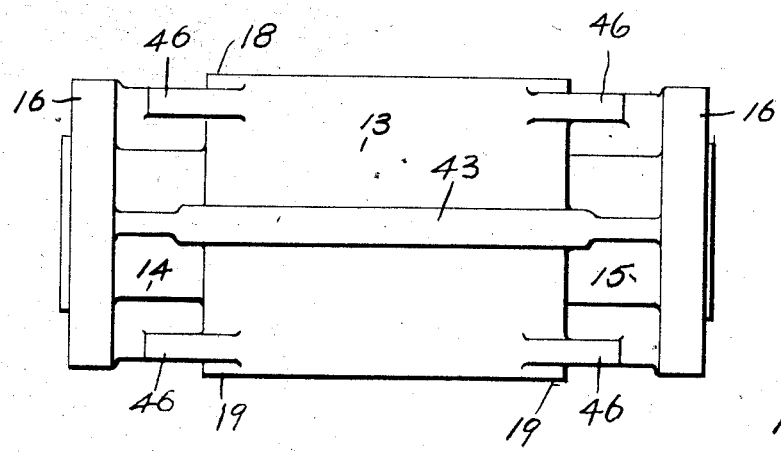
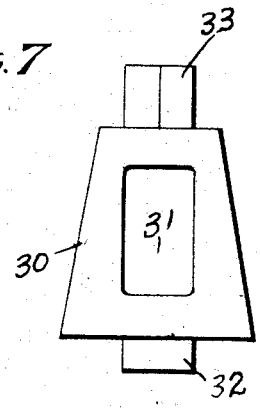
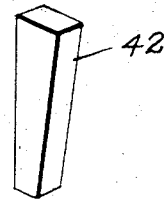
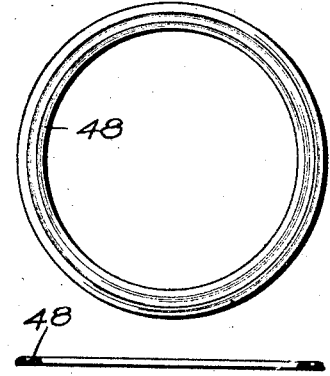
INVENTOR
FREDERICK E. KEY
BY Edward E. Longan
ATTY.

Patented Sept. 4, 1928.

1,683,555

UNITED STATES PATENT OFFICE.

FREDERICK E. KEY, OF EAST ST. LOUIS, ILLINOIS, ASSIGNOR TO KEY BOILER EQUIPMENT CO., OF EAST ST. LOUIS, ILLINOIS, A CORPORATION OF MISSOURI.

VALVE.

Application filed July 17, 1926. Serial No. 123,091.

My invention relates to improvements in valves, and has for its primary object the construction of a valve designed especially for use in oil refineries and which is capable of handling extremely high pressures and temperatures.

A further object is to construct a valve in which the valve proper is mounted in a separate housing or casing which can be readily opened so that the valve may be cleaned or entirely removed for re-grinding or replacement without taking down the line in which it is mounted.

A still further object is to construct a valve which is operated by gears and in which the valve may be removed without disturbing the gears and in which the gears are so protected that the accumulation of what is known in the oil trade as coke or other residue on the gears is prevented.

A still further object is to construct a valve which may be locked either in opened or closed position so that there will be no accidental opening or closing of the same.

In the drawings:

Fig. 1 is an end view of my valve;

Fig. 2 is a longitudinal section taken on the line 2—2 of Fig. 1;

Fig. 3 is a top plan view of my valve;

Fig. 4 is a similar view with the top plate and gearing removed;

Fig. 5 is a vertical longitudinal section of the casing or body taken on the line 5—5 of Fig. 4 with the valve and its housing removed;

Fig. 6 is a side elevation of the valve, body or housing, with both the upper and lower plates removed;

Fig. 7 is a side elevation of the rotary plug employed;

Fig. 8 is a perspective view of one of the wedges made use of when securing the valve housing within the casing;

Fig. 9 is a plan view of one of the corrugated gaskets;

Fig. 10 is a cross section of the same;

Fig. 11 is a top plan view of a modified form of valve housing; and

Fig. 12 is a side elevation of the same.

In the construction of my device I employ a casing or valve body 13, which is provided at diametrically opposite points with cylindrical projections 14 and 15. These cylindrical projections are each provided on their outer ends with a flange 16, which is provided with suitable openings 17 for the passage of bolts so that the casing or body can be secured in a pipe line. The casing or body is provided on its upper edge with an upwardly extending flange 18 and on its lower edge with a flange 19. A short distance below the flange 18 is an inwardly extending flange 20. The cylindrical projection 14 is provided with a bore 21 and the cylindrical projection 15 with a bore 22. The bore 21 communicates with the interior 23 of the casing 13. The bore 22 is provided adjacent its inner end with a tapered bore 24, which is concentric with the bore 22 and which is designed to receive the tapered projection 25 of the valve housing 26. The valve housing 26 is provided with a substantially rectangular bore 27 which extends horizontally and diametrically through the housing and which communicates with a cylindrical bore 28 which is formed through the tapered projection 25. The valve housing 26 is also provided with a vertically extending tapered bore 29 in which is located a rotary plug 30. The rotary plug 30 has an elongated opening 31 passing diametrically therethrough, this opening being of the same size as the opening 27. The area of these openings 27 and 31 is the same as the area of the bores 21 and 22 so that there will be no back pressure set up in the casing when the valve is opened. The rotary plug 30 is tapered to fit the bore 29 and both the bore 29 and rotary plug 30 are ground to insure a perfect fit. The rotary plug 30 is provided on its lower end with a cylindrical projection 32 and on its upper end with a square projection 33. The square projection 33 is slidably located in a square opening 34 formed in the hub of a gear 35. The gear 35 meshes with a pinion 36 which is carried by a shaft 37. The shaft 37 has keyed thereon a hand wheel 38 so that the gear can be rotated.

Formed on the valve housing and adjacent the tapered portion 25 are outwardly extending portions 39 and on the inside of the casing are formed projections 40 which have their edges 41 inclined as illustrated in Fig. 5, these inclined edges being opposite the face of the projections 39 so that when the wedges 42 are inserted, the tapered portion 25 of the valve housing will be firmly seated in the tapered bore 24 and the housing held in position. By means of these wedges this connection can be made sufficiently tight to prevent any leakage and by reason of the portion being tapered the housing can be readily removed when the wedges have been taken out.

The casing or the body 13 is provided midway its ends with a flange 43 which is provided with a plurality of openings 44 so as to permit the passage of bolts 45. The casing or housing is also provided adjacent its upper and lower edges with flanges 46 through which some of the bolts 45 pass. This is necessary because the bolts, which are located adjacent the cylindrical projections 14 and 15, could not extend entirely through as they would interfere with the passage of the oil or gas. Resting on the flange 20 is a disk 47 having a central opening, which opening is provided with a downturned flange 48, the flange 48 resting on the upper end of the rotary plug 30. Located on the disk 47 is a corrugated gasket 48 which is preferably formed of spring steel and which is designed to be contacted with by the cylindrical flange 49 formed integral with the upper cap 50.

Resting on the flange 18 is a similar gasket 51 which enters a circular recess 52 formed in the cap 50 and which surrounds the flange 49. The cap 50 is also provided with a plurality of stiffening ribs 53, which are for the purpose of preventing the cap from springing due to internal pressure in the casing or body. Projecting upward from the cap 50 is a packing gland 54 through which the valve stem or the shaft 37 passes and is for the purpose of preventing any leakage along the shaft. 55 represents the lower cap which is provided with a central boss 56 through which a screw 57 passes. The cap 55 is provided on its inner face with a centrally located circular depression 58. Resting on the inner face of the cap 55 is a steel disk 59 which supports a circular ringshaped corrugated gasket 60. The disk 59 is provided at its center and on both sides with disks 61 and 62. These disks are preferably spotwelded on to the plate 59 and are for the purpose of strengthening that portion of the plate, the disk 61 being immediately below the cylindrical projection 32 of the gate and the disk 62 immediately above the screw 57. It will be noted from Fig. 4 that the bore 29 of the valve housing 26 is eccentric to its outer circumference. This is for the purpose of preventing any cracking of the housing adjacent the ribs 39 as the body of metal at that point has a much greater volume and consequently, if the housing were bored concentric with the general outer contour of the housing, the difference in expansion and contraction at that point would be too great.

In Figs. 11 and 12 I have illustrated another form of valve housing which has a body portion 63, ribs or flanges 64, a tapered portion 65, and a tapered bore 66. These portions of the valve housing are identical with the valve housing 26. The valve housing is also provided with the opening or port 67. The difference in this housing, however, over the other is that it is provided with a vertically extending slot 68 diametrically opposite the tapered portion 65. This permits more ready expansion and contraction of the valve housing which is desirable in some cases as it gives the valve housing a yielding or spring grip on the rotary plug and prevents it from binding.

The assembling of my device is as follows: After all of the parts have been properly machined and finished, the pinion 36 together with its operating mechanism is assembled in the cap 50. The disk 47 is then placed in the casing 13 after which the gear 35 is placed in position. The corrugated gasket 48 is placed on the disk, and the corrugated gasket 51 placed on the flange 18. The cap 50 is placed in position on the casing and secured thereto preferably by means of the bolts extending through the flanges or projections 46. The casing is then inverted and the valve housing 26 placed in position with the projection 25 entering the tapered bore 24. The wedges 42 are then driven home tightly securing the housing within the casing. The rotary plug is next placed in position after which the gasket 60 is placed on the flange 19. The disk 59 is next placed on the gasket after which the cap 55 is placed in position and secured in a manner similar to the cap 50. The bolts 45 are next passed through both caps and through the flange 43 and the nuts tightened thus completing the assembly of the valve, the square projection 33 of the gate of course slidably passing through the square opening 34 in the gear 35. The screw 57 is then tightened forcing the rotary plug 30 upward into the housing. This causes the upper edge of the rotary plug to contact with the flange 48 carried by the disk 47, which has been previously placed in position causing the disk to spring upward slightly as provided for in routing out the lower face of the gear 35. At the same time the disk 59 is forced upward by reason of the screw 57 contacting with the disk 62. This in turn forces the disk 61 against the cylindrical projection 32.

The valve is now ready to be secured in the line, which is done by means of bolts passing through the openings 17 in the flanges 16 and through similar flanges provided with openings on the ends of the pipe line. Assuming that the valve is closed and is to be opened, the screw 57 is loosened slightly thus permitting the spring tension set up in the disk 47 to force the rotary plug downward and loosen it in the housing. The hand wheel 38 is then rotated until the valve is opened after which the screw 57 is again tightened, driving up the rotary plug 30 within the housing and making a tight fit so that accidental turning of the rotary plug or of the hand wheel is impossible.

It will be noted from Figs. 2 and 4 that the valve housing and rotary plug are practically surrounded by the hot fluid, which may be either oil or gas, so that there will be no unequal expansion or contraction of the operating parts of the valve proper, that is the housing and the rotary plug, which might cause a leakage. It is very essential in fact that all parts of the valve, pipe line, and the casing or body, be rendered absolutely leak-proof for the reason that in oil refineries, especially where the cracking process takes place, the oil, or rather oil gas, which is being cracked, passes through the valve and pipe line under a pressure of about 700 pounds and at a temperature of about 900 degrees F., and it has been found that where even a slight leak is sprung, the escaping gas under this high pressure and temperature ignites immediately on coming in contact with the air and has resulted in series explosions.

By my construction the valve is protected and entirely enclosed within a leak-tight casing. Should it become necessary at any time to remove the valve for regrinding or replacement or to clean out the housing and valve from accumulations of carbon or other residue, the caps 50 and 55 can be removed and the entire valve disassembled and removed from the housing without in any way disturbing the pipe line connection thereby reducing the cost incident to replacement, regrinding or cleaning. In fact should a valve need regrinding it is only necessary to remove the old valve housing and gate and insert a new one while the other is being repaired thereby eliminating long shut-downs for repairs.

Another particular advantage of my valve is that when the same is to be opened or closed, the rotary plug, as before mentioned, is pushed downward and loosened in the housing thereby reducing friction between the rotary plug and the housing and thereby preventing undue and excessive wear of the valve seat.

The disk 47 also prevents the accumulation of coke or other residue in the chamber above it thus protecting the gear and pinion because, if this residue were allowed to accumulate on the gear and pinion, it would be impossible to operate the same for opening and closing the valve.

It will be observed from the foregoing that my improved valve is capable of standing excessive high pressures and heat without leakage, and can be repaired, as hereinbefore mentioned, or parts can be replaced without disrupting the pipe connection, easily operated, and it may be securely locked in an opened or closed position.

The particular advantage of having the rotary plug 30 tapered is that when the valve housing and gate are in position within the casing and surrounded entirely by the liquid or gas under pressure, there is an unbalanced pressure area on opposite ends of this rotary plug, the greatest pressure area, of course, being at the largest end of the tapered rotary plug and this unbalanced area causes the pressure to have a tendency to force the rotary plug tightly into the valve housing thereby greatly assisting the screw 57 and preventing any leakage.

It is to be understood that both the housing and rotary plug may be made of a metal or composition of metals different from the casing. This is essential in many instances. For instance if super-heated steam were being handled, it would be desirable to make the valve and valve housing out of brass or bronze since the moisture would not corrode it. In other instances, it may be found desirable to make the housing and rotary plug from forgings. They may also be made from castings without departing from the spirit of my invention.

Having fully described my invention, what I claim is:—

1. A valve comprising a casing, a valve housing adapted to be removably secured within said casing and having its major portion free and unattached, means for securing said housing within said casing, a rotary plug mounted in said housing, means within the casing for operating said rotary plug, means for locking said rotary plug when in opened or closed position, removable caps carried by said casing for affording access thereto for the removal and replacement of the valve housing and rotary plug, and means projecting through one of said caps for placing said rotary plug operating means in operation.

2. A valve comprising a casing, a valve housing removably secured therein, means for securing said housing in said casing, a rotary plug removably mounted in said housing, means carried by opposite sides of the casing for affording access to the interior thereof, means projecting through one of said removable means for opening and closing the rotary plug, and a disk for preventing the accumulation of sediment around said opening and closing means.

3. A valve comprising a casing, a valve housing having a tapered valve seat secured within and to one side thereof, a tapered rotary plug removably mounted in the housing, removable means carried by the casing for affording access thereto, means for opening and closing the rotary plug, and means for removably securing the valve housing within the casing.

4. A valve housing comprising a casing, a valve housing having a valve seat formed therein secured in said casing, a rotary plug removably mounted in the housing, means carried by the casing for affording access thereto, means for opening and closing the rotary plug, and wedges for removably securing the valve housing within the casing.

5. A valve comprising a cylindrical casing having diametrically opposite inlet and outlet ports in its sides, a valve housing removably secured within the casing and having a portion thereof extending into the outlet port, a rotary plug located in the housing, caps for closing each end of said casing, means carried by and extending through one of said caps for operating said rotary plug, means for preventing the substance passing through said valve from contacting with its operating mechanism, and means extending through the other of said caps for locking said rotary plug.

6. A valve comprising a cylindrical casing having diametrically opposite inlet and outlet ports, a valve housing located within said casing and extending into and communicating with said outlet port, means for removably securing said housing in position, a rotary plug located in said housing, caps for closing each end of said casing, a mechanism carried by and extending through one of said caps for operating said rotary plug, and means for preventing the substance passing through said valve for contacting with its operating mechanism, said means also tending to break frictional contact between the rotary plug and housing.

7. A valve comprising an open cylindrical casing having an inlet and an outlet port, a valve housing removably located in said casing and projecting partly into one of said ports, a tapered rotary plug located in said housing, means for removably securing said housing in position within said casing, caps for closing said casing, means extending through one of said caps into said casing for operating said rotary plug, and means extending through the other of said caps for frictionally locking said rotary plug.

8. A valve comprising an open cylindrical casing having an inlet and an outlet port, a valve housing located in said casing and having a portion projecting into one of said ports, means for removably securing said valve housing in said casing and port, a tapered rotary plug located in said housing, caps for closing said casing, means extending through one of said caps into said casing and operatively connected to said rotary plug for opening and closing the same, and means carried by the remaining cap for forcing said rotary plug into said housing whereby said rotary plug is held locked in open or closed position.

9. A valve comprising a cylindrical casing having an inlet and an outlet port, a valve housing provided with a vertically extending slot located in said casing and projecting into one of said ports, means for removably securing said valve housing in said casing and port, a rotary plug located in said housing, caps for closing said casing, means for securing said caps in position, and means extending through one of said caps and into said casing for operating said rotary plug.

10. A valve comprising a casing having outwardly extending diametrically opposite projections, each of said projections having a bore extending entirely therethrough, one of said projections having a tapered bore formed therein concentric with and at the inside end of the first mentioned bore, a valve housing having a tapered projection on one side, said tapered projection adapted to be seated in said tapered bore, projections formed on said housing and on the inside of said casing and adapted to have wedges inserted therebetween for securing said valve housing in said casing, a rotary plug located in said housing, means located within said casing for rotating said rotary plug, closures for the ends of said casing, and means extending through one of said closures for placing said rotary plug rotating means in operation.

11. A valve comprising a casing having outwardly extending diametrically opposite projections, each of said projections having a bore extending entirely therethrough, one of said projections having a tapered bore formed therein concentric with and at the inside end of the first mentioned bore, a valve housing having a tapered projection on one side, said tapered projection adapted to be seated in said tapered bore, projections formed on said housing and on the inside of said casing and adapted to have wedges inserted therebtween for securing said valve housing in said casing, a rotary plug located in said housing, means located within said casing for rotating said rotary plug, closures for the ends of said casing, means extending through one of said closures for placing said rotary plug rotating means in operation, and means for securing said rotary plug in opened or closed position.

12. A valve comprising a cylindrical casing, diametrically opposite projections having bores therethrough extending outwardly from said casing, a valve housing having a tapered projection located within said casing, said tapered projection extending into one of said bores, means co-acting with said housing and the interior of the casing for holding said valve housing in position, a rotary plug carried by said valve housing, closures for opposite ends of said casing, and means within said casing and operable without one of said closures for opening and closing said rotary plug.

13. A valve comprising a cylindrical casing, diametrically opposite projections having bores therethrough extending outwardly from said casing, a valve housing having a tapered projection located within said casing, said tapered projection extending into one of said bores, means co-acting with said housing and the interior of the casing for holding said valve housing in position, a rotary plug carried by said valve housing, closures for opposite ends of said casing, means within said casing and operable without one of said closures for opening and closing said rotary plug, and means for securing said rotary plug in opened or closed position.

In testimony whereof I have affixed my signature.

FREDERICK E. KEY.